United States Patent [19]
Heaton et al.

[11] Patent Number: 6,148,594
[45] Date of Patent: Nov. 21, 2000

[54] COTTON RETRIEVER

[75] Inventors: William Cliff Heaton; Joe R. McCaughan, both of Clarksdale; Glen T. Sledge, Lyon, all of Miss.

[73] Assignee: The Retrie ver Company, Lyon, Miss.

[21] Appl. No.: 09/259,192

[22] Filed: Feb. 26, 1999

[51] Int. Cl.[7] .................................................. A01D 46/08
[52] U.S. Cl. ........................................ 56/28; 56/48
[58] Field of Search ................................. 56/14.1, 14.4, 56/48, 127, 28, 16.4, 16.6, 40, 36; 15/383

[56] References Cited

U.S. PATENT DOCUMENTS

| | | | |
|---|---|---|---|
| 106,601 | 8/1870 | McRae | 56/40 |
| 1,312,010 | 8/1919 | Thrower | 56/40 |
| 2,715,809 | 8/1955 | Buell | 56/28 |
| 2,928,224 | 3/1960 | Powell | 56/28 |
| 3,101,581 | 8/1963 | Kelso et al. | 56/28 |
| 3,105,340 | 10/1963 | Hewitt | 56/48 |
| 3,425,097 | 2/1969 | Rood, Jr. et al. . | |
| 3,945,179 | 3/1976 | Listov et al. | 56/28 |
| 3,955,346 | 5/1976 | Coon . | |
| 4,390,376 | 6/1983 | Rood, Jr. . | |
| 4,497,088 | 2/1985 | Lehman . | |
| 4,821,496 | 4/1989 | Kysar | 56/28 |
| 5,311,728 | 5/1994 | Schlueter | 56/28 |

FOREIGN PATENT DOCUMENTS

| | | | |
|---|---|---|---|
| 197329 | 9/1973 | U.S.S.R. | 56/48 |
| 398211 | 2/1974 | U.S.S.R. | 56/48 |

*Primary Examiner*—Thomas B. Will
*Assistant Examiner*—Nathan Mammen

[57] ABSTRACT

A method and apparatus for retrieving material, typically cotton, from the ground, comprising a main body, a rotating saw drum, a rotating brush drum, and a conveyor device. The main body is coupled to a large vehicle, such as a cotton picker. The saw drum has projections (or teeth) that collect the material from the ground as the saw drum rotates. The rotating brush drum, located inside of the main body and proximate the saw drum, removes the material from the saw drum and deposits it onto the conveyor device. The conveyor device then transports the material to a central area, where a suction tube removes the cotton to a storage volume.

19 Claims, 4 Drawing Sheets

COTTON RETRIEVER

BACKGROUND OF THE INVENTION

1. Field of the Invention

The present invention relates generally to devices for collecting material from the ground. More specifically, the invention relates to devices for collecting cotton from the ground.

2. Description of the Related Art

Cotton gins store and transport cotton in "modules," or compressed bundles of cotton. After the cotton is picked, it is compressed into modules and transported to the gin yard, where it awaits processing. Finally, the modules are picked up and taken to the gin. During the process of loading and unloading these modules, some cotton falls to the ground. Collecting the fallen cotton is beneficial because the cotton can still be used. Moreover, this fallen cotton tends to inhibit the growth of sod and grass necessary to maintain a firm surface on which trucks can operate. The present invention efficiently retrieves the fallen cotton in a cost-effective manner such that it is suitable for processing through a gin facility.

Typically, cotton retriever machines are designed to move along the furrows of a cotton field and remove the cotton that lies scattered on the ground after harvesting, as described in U.S. Pat. Nos. 4,497,088 issued to Lehman on Feb. 5, 1985, and 3,955,346 issued to Coon on May 11, 1976. These machines typically employ cotton retrieving belts or wheels that roll directly on the ground collecting cotton, with the forward motion of the machine causing the belt or wheel to rotate. The Lehman patent describes a machine that employs a belt that is slotted transversely such that the slots are closed when the belt is straight, and are open when the belt is flexed, as when it passes over a pulley. The transverse slots close and grip the cotton as the belt rolls over the ground, and then the belt lifts the cotton from the ground. The Coon patent, on the other hand, describes a machine that utilizes ground wheels with teeth that impale the cotton as the wheels roll over the surface of cotton furrows. Both types of machines typically use a saw drum to convey the cotton from the wheel or belt through the cotton retriever.

One limitation of machines that employ belts or wheels is that they can pick up only a small amount of cotton per slot or per tooth, thereby eliminating the use of the machine for collection of large quantities of cotton. These machines were designed to collect the scattered pieces of cotton that remain after harvesting, and cannot effectively retrieve the large quantity of cotton in gin yards and other places where modules have been loaded and unloaded.

Consequently, the need exists for a cotton retriever that can efficiently collect the large quantities of cotton left in gin yards. Thus, the present invention provides a device that can effectively collect large amounts of cotton by utilizing a saw drum, or a rotary cylinder having a plurality of saw teeth, to remove the fallen cotton from the ground. The saw drum rotates at a fast rate relative to the retriever's speed over the ground, thereby increasing the cotton retrieval rate. Although the present invention was developed primarily to retrieve cotton from the ground, the invention can be used to remove any material from the ground. For example, the present invention may be used to remove litter from a large area of ground.

SUMMARY

A method and apparatus for retrieving material, typically cotton, from the ground, comprising a main body, a rotating saw drum, a rotating brush drum, and a conveyor device. The main body is coupled to a large vehicle, for example, a cotton picker. The rotating saw drum, located inside of the main body, and has projections that collect the material from the ground. The projections are located just above, but do not touch, the ground. The rotating brush drum, located inside of the main body and proximate to the saw drum, removes the material from the saw drum and deposits it onto the conveyor device. The conveyor device then transports the material to a storage volume. In a preferred embodiment, the conveyor device comprises a screw conveyor and a suction tube. The screw conveyor transports the material to a central area, and the suction tube creates an airflow through the apparatus that moves the material to the storage area.

BRIEF DESCRIPTION OF THE DRAWINGS

To further aid in understanding the invention, the attached drawings help illustrate specific features of the invention and the following is a brief description of the attached drawings.

DETAILED DESCRIPTION OF THE INVENTION

The present invention is a method and apparatus that retrieves material, such as cotton, from the ground. This disclosure describes numerous specific details that include specific structures, their arrangement, and functions in order to provide a thorough understanding of the present invention. One skilled in the art will appreciate that one may practice the present invention without these specific details.

The present invention generally comprises a main body, a rotating saw drum, a rotating brush drum, and a conveyor device. The main body is coupled to a large vehicle, such as a cotton picker. The saw drum has projections (or teeth) that collect the material from the ground as the saw drum rotates. The rotating brush drum, located inside of the main body and proximate the saw drum, removes the material from the saw drum and deposits it onto the conveyor device. The conveyor device transports the material to a central area where a suction tube removes the cotton to a storage volume.

Figure 1:
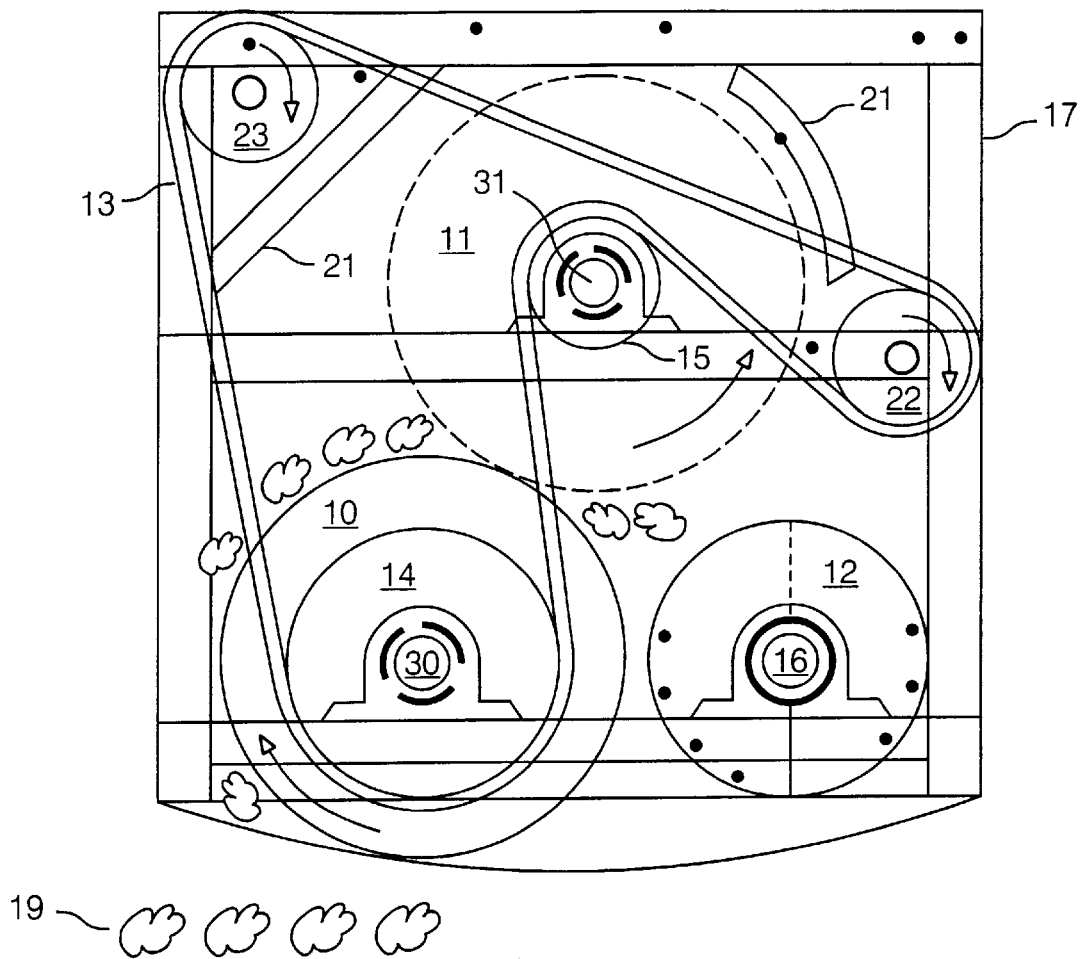
FIG. 1 is a cross-sectional side view of one embodiment of the present invention comprising a main body, a rotating saw drum, a rotating brush drum, and a conveyor device.

FIG. 1 is a cross-sectional side view of one embodiment of the present invention that includes a saw drum 10, a brush drum 11 with a housing 21, a screw conveyor 12, shafts 16, 30, 31, pulleys 14, 15, 22, 23, a main body 17, and a belt 13. The saw drum 10 is coupled to a shaft 30 that is coupled to the main body 17. The brush drum 11 is coupled to a shaft 31 that is coupled to the main body 17 and is positioned just above and just behind the saw drum 10, with its axis parallel to that of the saw drum 10. In a preferred embodiment, a screw conveyor 12 is coupled to a shaft 16 that is coupled to the main body 17, and is positioned behind the saw drum. The saw drum 10 is coupled to a pulley 14. The brush drum 11 is coupled to a pulley 15. Pulley 22 is powered by a hydraulic motor (not shown) and drives belt 13. The belt 13 moves in the direction indicated by the arrow, which in turn causes saw drum 10 and brush drum 11 to rotate in the directions indicated by the arrows.

Figure 2:
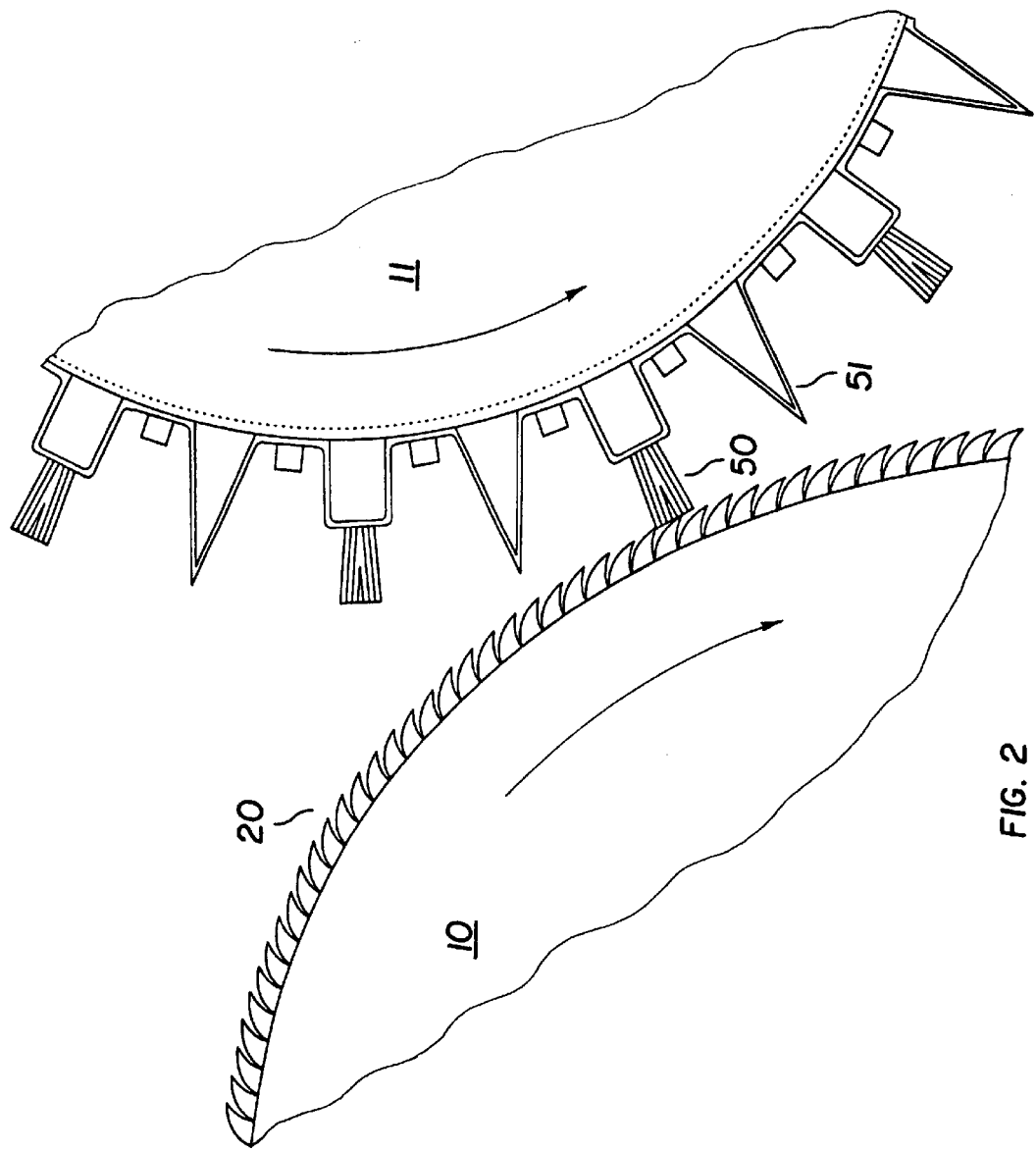
FIG. 2 is a close-up view of the saw drum and the brush drum.

FIG. 2 is a close-up view of the saw drum and brush drum. The saw drum has projections for removing material from the ground. Typically, the saw drum is a channel saw drum, as described in the Lehman patent. Flexible metal strips or channel gin saw-teeth 20 are coupled to the surface of the drum in encircling spirals such that the saw teeth 20 are exposed at the edges. The saw teeth 20 of the drum collect the cotton by impaling the cotton fibers as the drum rotates. In order to collect other types of material, a saw drum of a different configuration may be used.

The saw drun 10 collects material, typically cotton 19 (FIG. 1), from the ground and carries it to the brush drum 11. The brush drum comprises a cylindrical drum with brushes 50 and angle iron 51 extending radially. The effective radius of the pulley 15 of the brush drum 11 is smaller than that of the pulley 14 of the saw drum 10, so the rotation of the brush drum 11 is faster than that of the saw drum 10. Thus, the brush drum knocks the cotton from the saw teeth towards the screw conveyor 12. Moreover, the brushes 50 and angle iron 51 substantially fill the shield 21 (FIG. 1) so that the rotation of the brush drum creates an airflow. This airflow helps to remove the cotton from the saw drum and deposits the cotton in the screw conveyor 12.

Figure 3:
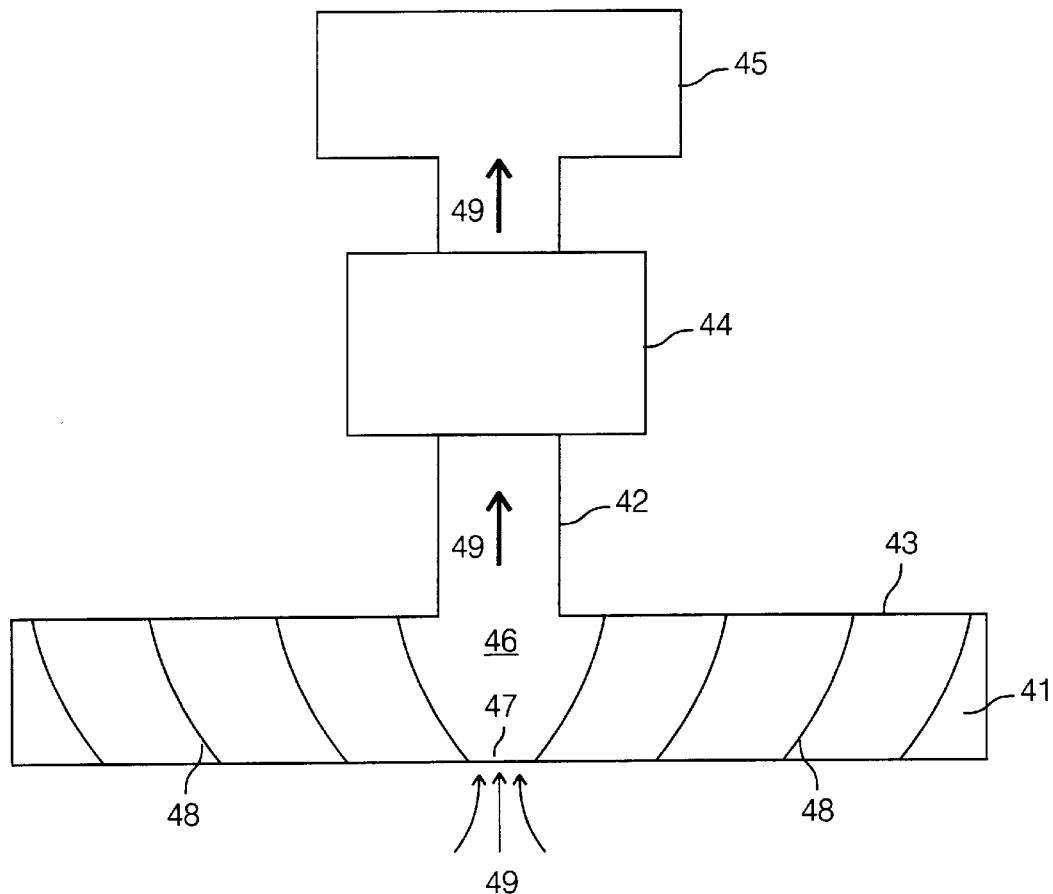
FIG. 3 is a cross-sectional view of the conveyor and suction tube.

FIG. 3 is a cross-sectional schematic of the screw conveyor 41 and suction tube 42 which transport the cotton from the brush drum to a storage area 45. The screw conveyor rotates upon a single shaft to which are coupled flights 48 in the form of a helical screw. The flights 48 are right-handed on one half of the conveyor and left-handed on the other half such that when the screw turns within the stationary casing 43 the cotton on the screw conveyor advances to a central area 46. Holes 47 in the bottom of casing 43 provide a flowpath for air to enter the center of the casing, entrain the cotton, and exit the casing into the suction tube. The suction tube removes the cotton and transports it to a storage area 45. Fan 44 creates an airflow, the direction of which is indicated by the arrows 49, to move the cotton from the cross conveyor 41 to the storage volume 45.

Figure 4:
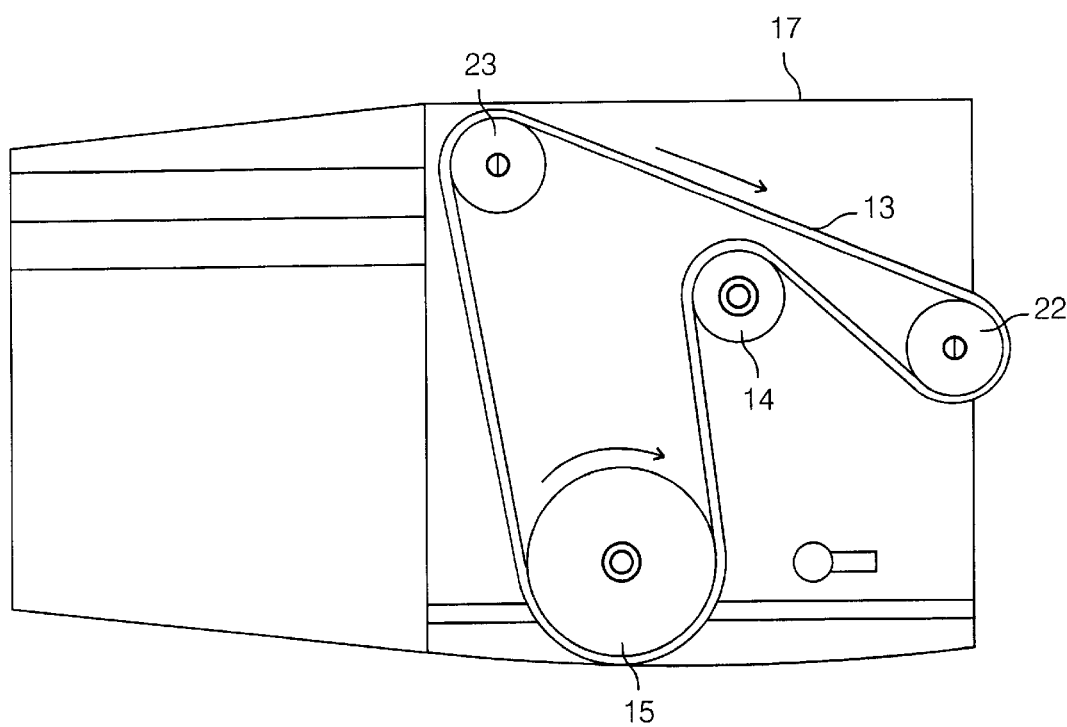
FIG. 4 is a perspective view of one embodiment of the present invention.

FIG. 4 is a perspective view of one embodiment of the present invention, illustrating the belt 13 coupled to pulleys 14, 15, 22, 23 which are in turn coupled to the main body 17. The belt 13 moves in the direction indicated by the arrow, which causes pulleys 14, 15, 22, 23 to rotate in the directions indicated by the arrows. The rotation of pulley 14 causes the brush drum 11 (FIG. 1) to rotate, and the rotation of pulley 15 causes the saw drum 10 (FIG. 1) to rotate. The effective radius of the pulley 14 is smaller than that of pulley 15, so that the rotation of the brush drum 11 is greater than that of the saw drum 10.

Thus, the present invention is an apparatus for retrieving material, typically cotton, from the ground, comprising a main body, a rotating saw drum, a rotating brush drum, and a conveyor device. The main body is to be coupled to a large vehicle, such as a cotton picker. The saw drum has projections (or teeth) that collect the material from the ground as the saw drum rotates. The rotating brush drum, located inside of the main body and proximate the saw drum, removes the material from the saw drum and deposits it onto the conveyor device. The conveyor device transports the material to a central area, where a suction tube removes the cotton to a storage volume.

Other embodiments of the invention will be apparent to those skilled in the art after considering this specification or practicing the disclosed invention. The specification and examples above are exemplary only, with the true scope of the invention being indicated by the following claims.

We claim the following invention:

1. A retrieving apparatus for picking up cotton or litter material from the ground, said retrieving apparatus comprising:

an enclosed main body defining an interior volume and constructed to mount to a vehicle, said main body further having a bottom at least a portion of which is open, said bottom constructed to operate proximate to a ground surface;

a saw drum rotatable about a longitudinal axis and mounted within said main body proximate to and above said open portion of said bottom, said saw drum including a plurality of saw-teeth protruding from a periphery of said saw drum for capturing the cotton or material on the ground surface;

a brush drum rotatable about a longitudinal axis and mounted within said main body and positioned above said saw drum, said brush drum including a plurality of brushes extending from a periphery thereof, wherein said brush drum further includes at least two rigid angles extending longitudinally along said brush drum and from said drum periphery, said rigid angles parallel to said brush drum longitudinal axis;

a shield mounted above said brush drum such that said saw drum, said brush drum, and said shield divide said interior volume into a forward volume and a rear volume and induce an air flow between said drums during operation; and a drive mechanism arranged to rotate said drums in opposite directions and to rotate said brush drum at a faster rate than said saw drum.

2. The retrieving apparatus according to claim 1 wherein an outer end of said brushes are proximately tangential to said saw-teeth of said saw drum for dislodging the captured cotton or material from said saw-teeth.

3. The retrieving apparatus according to claim 2 wherein said saw-teeth are biased in the direction of rotation for capturing the cotton or material on the ground.

4. The retrieving apparatus according to claim 3 wherein said saw-teeth when most proximate said bottom of said main body are biased toward said forward volume.

5. The retrieving apparatus according to claim 1 wherein said shield extends an entire length of said brush drum.

6. The retrieving apparatus according to claim 5 wherein said shield is curved and is proximately tangential to an outer end of said rigid angles such that one of said at least two rigid angles is always proximate to said shield.

7. The retrieving apparatus according to claim 6 wherein said brushes and said rigid angles are arranged about said periphery of said brush drum in alternating rows.

8. The retrieving apparatus according to claim 1 wherein said main body further includes a rear outlet, said rear outlet of sufficient size to permit passage of gathered cotton or material therethrough from said rear volume.

9. The retrieving apparatus according to claim 8 wherein said main body includes a bottom having an enclosed portion further defining said rear volume and a gathering mechanism to transport the gathered cotton or material to said rear outlet.

10. A retrieving vehicle for picking up cotton or litter material from the ground, said retrieving apparatus comprising:

a vehicle for traversing an area of ground, said vehicle including a collection bin and a suction device for transporting the gathered cotton or material from an inlet to said collection bin;

an enclosed main body defining an interior volume and mounted to said vehicle, said main body further having a bottom at least a portion of which is open, said bottom constructed to operate proximate to a ground surface and said body further including an outlet at a rear in communication with said inlet;

a saw drum rotatable about a longitudinal axis and mounted within said main body proximate to and above said open portion of said bottom, said saw drum including a plurality of saw-teeth protruding from a periphery of said saw drum for capturing the cotton or material on the ground surface;

a brush drum rotatable about a longitudinal axis and mounted within said main body and positioned above said saw drum, said brush drum including a plurality of brushes extending from a periphery thereof, wherein said brush drum further includes at least two rigid angles extending longitudinally along said brush drum and from said drum periphery, said rigid angles parallel to said brush drum longitudinal axis;

a shield mounted above said brush drum such that said saw drum, said brush drum, and said shield divide said interior volume into a forward volume and a rear volume and induces an air flow between said drums during operation; and a drive mechanism arranged to rotate said drums in opposite directions and to rotate said brush drum at a faster rate than said saw drum.

11. The retrieving vehicle according to claim 10 wherein an outer end of said brushes are proximately tangential to said saw-teeth of said saw drum for dislodging the captured cotton balls or material from said saw-teeth.

12. The retrieving vehicle according to claim 11 wherein said saw-teeth are biased in the direction of rotation for capturing the cotton balls or material on the ground.

13. The retrieving vehicle according to claim 12 wherein said saw-teeth when most proximate said bottom of said main body are biased toward said forward volume.

14. The retrieving vehicle according to claim 10 wherein said shield extends an entire length of said brush drum.

15. The retrieving vehicle according to claim 14 wherein said shield is curved and is proximately tangential to an outer end of said rigid angles such that one of said at least two rigid angles is always proximate to said shield.

16. The retrieving vehicle according to claim 15 wherein said brushes and said rigid angles are arranged about said periphery of said brush drum in alternating rows.

17. The retrieving vehicle according to claim 16 wherein said main body includes a bottom having an enclosed portion further defining said rear volume and a gathering mechanism to transport the gathered cotton or material to said rear outlet.

18. A method of retrieving cotton or litter material from the ground comprising the steps of:

providing a vehicle for traversing an area of ground, the vehicle including a collection bin and a suction device for transporting the gathered cotton and material from an inlet to the collection bin;

providing an enclosed main body defining an interior volume, the main body further having a bottom at least a portion of which is open, the bottom constructed to operate proximate to a ground surface and the body further including an outlet at a rear;

mounting the main body to the vehicle;

connecting the suction device inlet to the main body outlet;

mounting a saw drum rotatable about a longitudinal axis within the main body proximate to and above the open portion of the bottom, the saw drum including a plurality of saw-teeth protruding from a periphery of the saw drum for capturing the cotton or material on the ground surface;

mounting a brush drum rotatable about a longitudinal axis within the main body and positioned above the saw drum, the brush drum including a plurality of brushes and a plurality of rigid angles extending longitudinally along the brush drum and from a periphery thereof;

mounting a shield above the brush drum such that the saw drum, the brush drum, and the shield divide the interior volume into a forward volume and a rear volume;

operating a drive mechanism to rotate the saw drum and brush drum in opposite directions;

rotating the brush drum at a faster rate than the saw drum to remove the gathered cotton or material from the saw drum and thereby inducing an airflow from the forward volume to the rear volume through the tangential interaction area of the brush drum and the saw drum; and suctioning the removed cotton and material from the rear volume for depositing in the collection bin.

19. The method of claim 18 wherein said step of mounting a brush drum includes a plurality of brushes and rigid angles extending the length of the drum and from a periphery of the drum in alternating rows.

* * * * *